(12) United States Patent
Kobayashi et al.

(10) Patent No.: US 12,691,616 B2
(45) Date of Patent: Jul. 28, 2026

(54) INJECTION APPARATUS AND METHOD OF MANUFACTURING RESIN BODY

(71) Applicant: CANON KABUSHIKI KAISHA, Tokyo (JP)

(72) Inventors: Toshiki Kobayashi, Kanagawa (JP); Junichi Matsumura, Shizuoka (JP); Kengo Nakajima, Kanagawa (JP); Akira Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/321,492

(22) Filed: May 22, 2023

(65) Prior Publication Data

US 2023/0382028 A1 Nov. 30, 2023

(30) Foreign Application Priority Data

May 30, 2022 (JP) ................................. 2022-087840

(51) Int. Cl.
| | |
|---|---|
| *B29C 45/17* | (2006.01) |
| *B29C 45/13* | (2006.01) |
| *B29C 45/53* | (2006.01) |
| *B29C 45/54* | (2006.01) |

(52) U.S. Cl.
CPC .......... *B29C 45/1773* (2013.01); *B29C 45/13* (2013.01); *B29C 45/53* (2013.01); *B29C 45/531* (2013.01); *B29C 45/544* (2013.01)

(58) Field of Classification Search
CPC ... B29C 45/1773; B29C 45/461; B29C 45/53; B29C 45/531; B29C 45/54; B29C 45/542; B29C 45/544; B29C 45/586
See application file for complete search history.

(56) References Cited

U.S. PATENT DOCUMENTS 4,540,359 A * 9/1985 Yamazaki ........... B29C 45/5008
425/593
4,988,273 A * 1/1991 Faig .......................... H02P 6/04
425/149

(Continued)

FOREIGN PATENT DOCUMENTS

| JP | H06278176 A | 10/1994 |
|---|---|---|
| JP | H08142141 A | 6/1996 |

(Continued)

*Primary Examiner* — Xiao S Zhao
*Assistant Examiner* — Joseph S Leyson
(74) *Attorney, Agent, or Firm* — Canon U.S.A., Inc. IP Division

(57) ABSTRACT

In an injection apparatus, a movable unit includes a ball screw including a moving block and a screw shaft. The moving block moves in a predetermined direction and is joined to an injection plunger. The screw shaft rotates to move the moving block. The screw shaft and the injection plunger are disposed side by side in a direction orthogonal to the predetermined direction. A fixing unit includes a first portion for holding a rear end part of the screw shaft, a second portion for holding a front end part of the screw shaft, and a third portion for holding the injection cylinder. The moving block is provided between the first portion and the second portion. The third portion is provided to be pressed by the injection cylinder when the injection plunger presses the resin.

22 Claims, 5 Drawing Sheets

(56) References Cited

U.S. PATENT DOCUMENTS

| | | | | |
|---|---|---|---|---|
| 2002/0006076 A1* | 1/2002 | Koide | .................... | B29C 45/54 |
| | | | | 366/100 |
| 2015/0158222 A1 | 6/2015 | Kitta et al. | | |
| 2019/0030773 A1 | 1/2019 | Sugahara et al. | | |
| 2019/0178292 A1* | 6/2019 | Iizuka | ...................... | F02C 6/12 |
| 2022/0314513 A1* | 10/2022 | Yamamoto | ............. | B29C 45/78 |

FOREIGN PATENT DOCUMENTS

| | | | |
|---|---|---|---|
| JP | H10329179 | A | 12/1998 |
| JP | 2003291173 | A | 10/2003 |
| JP | 2004237458 | A | 8/2004 |
| JP | 2006000887 | A | 1/2006 |
| JP | 2006256278 | A | 9/2006 |
| JP | 2011000796 | A | 1/2011 |
| JP | 2011156579 | A | 8/2011 |
| JP | 2013022816 | A | 2/2013 |
| JP | 2019104153 | A | 6/2019 |
| JP | 2020151951 | A | 9/2020 |
| JP | 6947957 | B1 | 10/2021 |
| JP | 2022023275 | A | 2/2022 |
| JP | 2022076973 | A | 5/2022 |

* cited by examiner

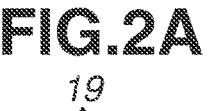
FIG.2A
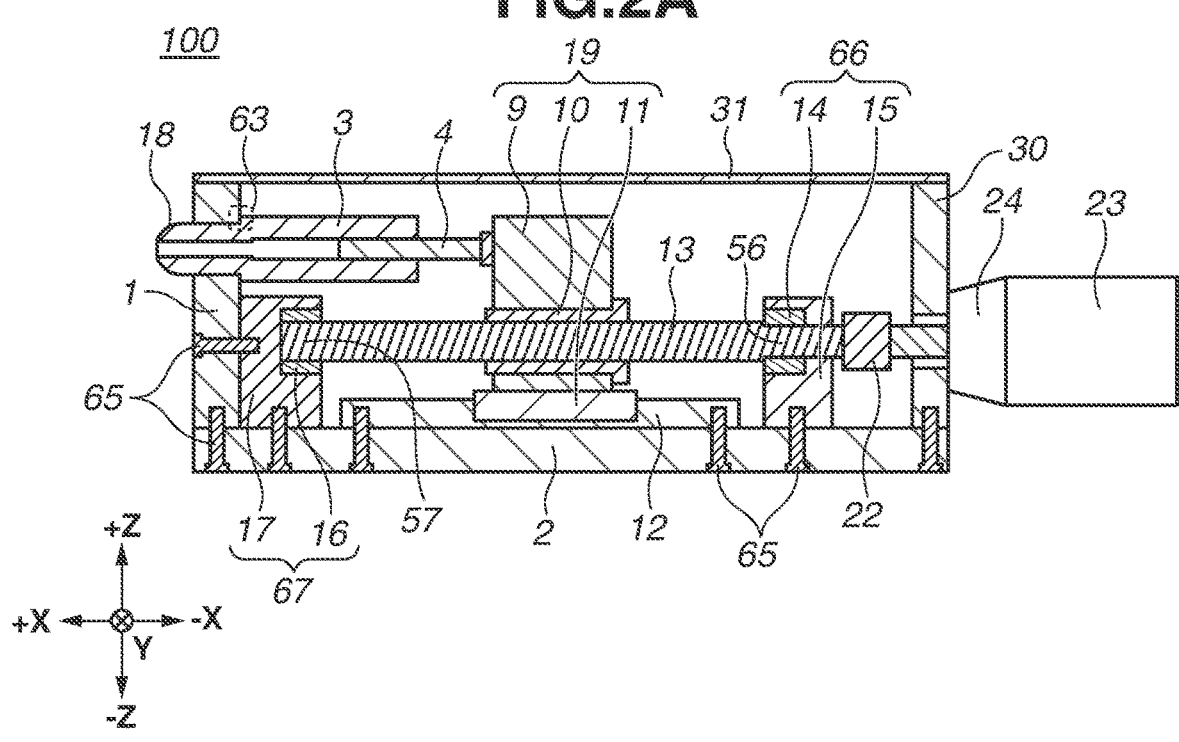
FIG.2B
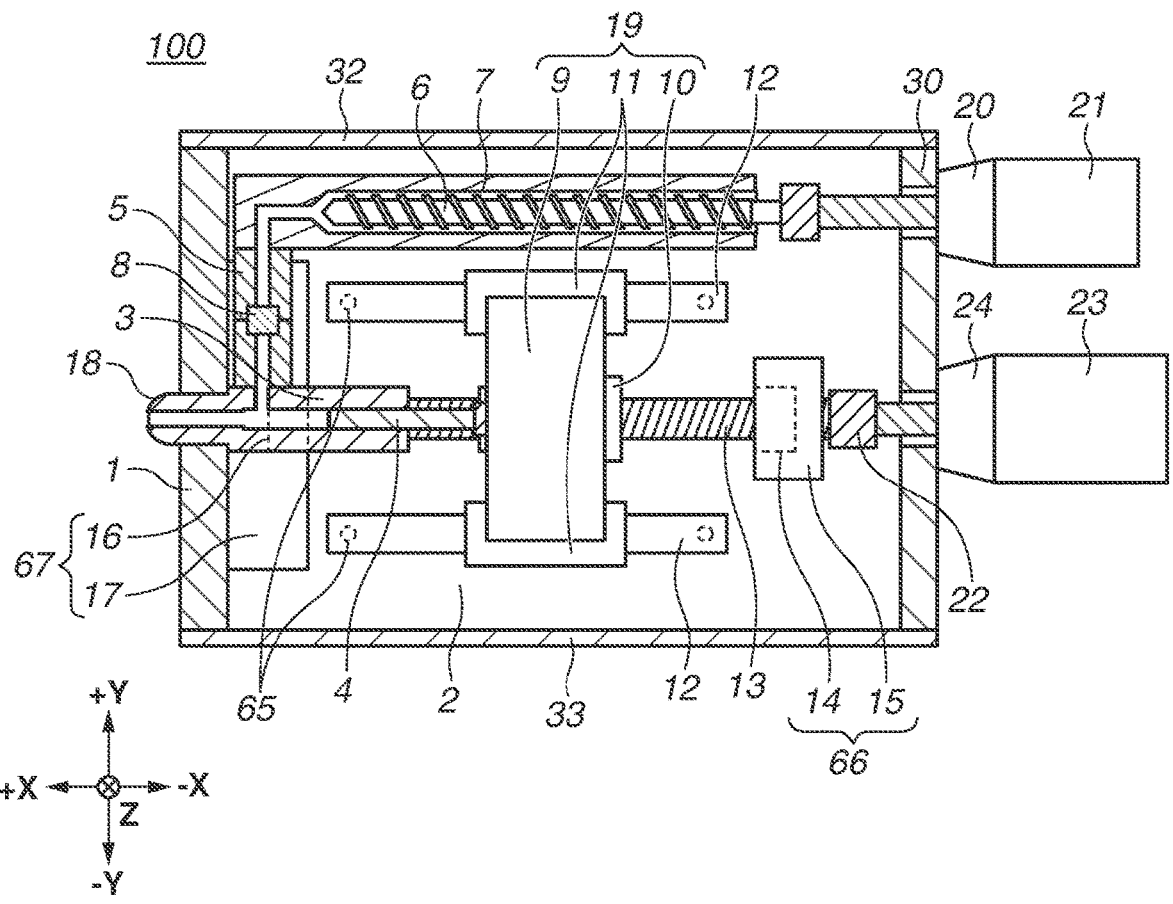

INJECTION APPARATUS AND METHOD OF MANUFACTURING RESIN BODY

BACKGROUND

Field of the Disclosure

The present disclosure relates to an injection apparatus.

Description of the Related Art

In a resin injection apparatus, using an injection plunger makes it possible to measure an amount of a resin to be injected. An injection apparatus discussed in Japanese Patent Application Laid-Open NO. 2019-104153 includes a front block that is erected on a base and provided with a heating barrel, a rear block that is erected on the base and provided with an injection servo motor, and a movable block that is movably provided between the front block and the rear block on the base and mounted with an injection plunger.

The technique discussed in Japanese Patent Application Laid-Open No. 2019-104153 provides an improvement in rigidity of the injection apparatus against force generated by injection. However, simple improvement in rigidity may cause upsizing of the injection apparatus.

SUMMARY

The present disclosure provides techniques advantageous in improvement of rigidity of an injection apparatus.

According to an aspect of the present disclosure, an injection apparatus includes an injection nozzle configured to inject a resin, an injection cylinder configured to store the resin to be supplied to the injection nozzle, an injection plunger configured to press the resin stored in the injection cylinder, a movable unit, configured to move the injection plunger, including a ball screw including a moving member and a screw shaft, the moving member being configured to move in a predetermined direction and being joined to the injection plunger, the screw shaft being configured to rotate to move the moving member, and a fixing unit, configured to hold the injection cylinder and the movable unit, including a first portion for holding a first end part of the screw shaft, a second portion for holding a second end part of the screw shaft, and a third portion for holding the injection cylinder. The screw shaft and the injection plunger are disposed side by side in a direction orthogonal to the predetermined direction. The moving member is provided between the first portion and the second portion. The third portion is provided so as to be pressed by the injection cylinder when the injection plunger presses the resin.

Further features of the present disclosure will become apparent from the following description of embodiments with reference to the attached drawings.

BRIEF DESCRIPTION OF THE DRAWINGS

FIGS. 2A and 2B are schematic views each illustrating an injection apparatus.

DESCRIPTION OF THE EMBODIMENTS

Figure 1A:
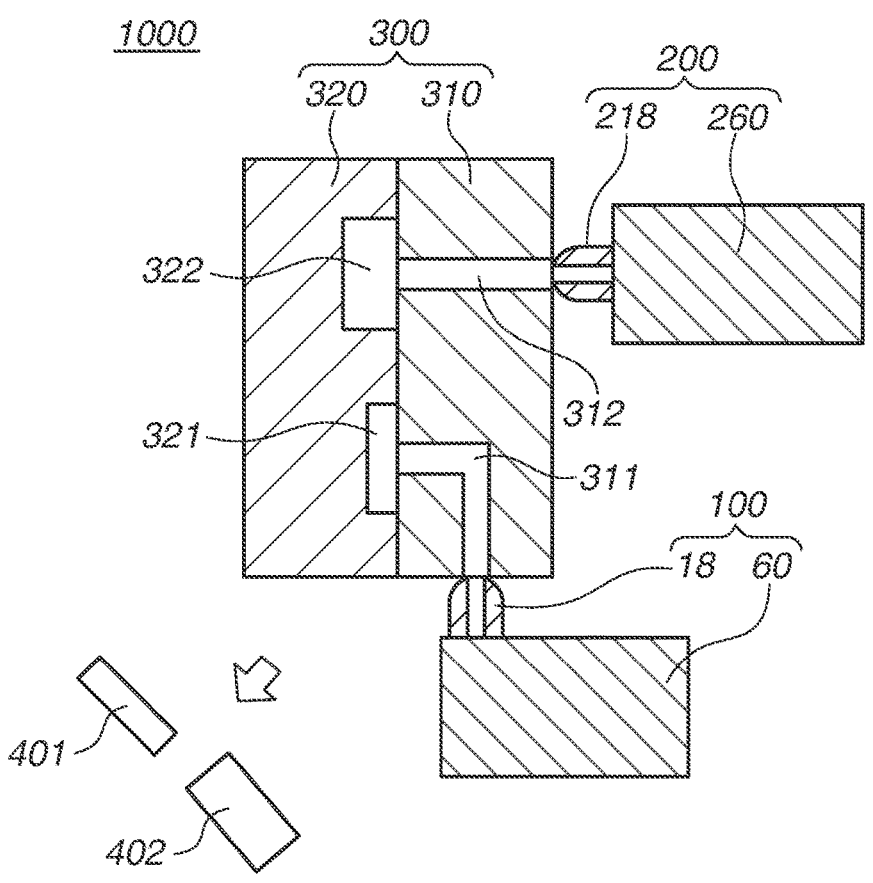
FIGS. 1A and 1B are schematic views each illustrating an injection apparatus.

Some embodiments of the present disclosure will be described below with reference to drawings. In the following description and drawings, components common to a plurality of drawings are denoted by common reference numerals. The common components are therefore described with mutual reference to the plurality of drawings, and description of the components denoted by the common reference numerals is appropriately omitted.

FIG. 1A is a schematic view of an injection molding system 1000 used for manufacturing a resin body. A usage of an injection apparatus 100 will be described with reference to FIG. 1A. The injection molding system 1000 may include the injection apparatus 100 and a mold 300. The mold 300 includes a cavity 321. A resin is injected from the injection apparatus 100 into the cavity 321 of the mold 300 to mold a resin body 401 having a shape corresponding to a shape of the cavity 321. The mold 300 may include a fixed mold 310 defining a runner 311, and a movable mold 320 defining the cavity 321.

The injection apparatus 100 includes an injection nozzle 18 injecting the resin, and a fixing unit 60 holding at least the injection nozzle 18. The nozzle 18 is connected to a sprue of the mold 300, and the resin is injected from the sprue into the cavity 321 through the runner 311. A boundary between the runner 311 and the cavity 321 is a gate. The runner 311 can be a hot runner or a cold runner.

The injection molding system 1000 may further include an injection apparatus 200 in addition to the injection apparatus 100. Further, the mold 300 may include a cavity 322. A resin can be injected from the injection apparatus 200 into the cavity 322 of the mold 300 to mold a resin body 402 having a shape corresponding to a shape of the cavity 322.

The injection apparatus 200 includes an injection nozzle 218 injecting the resin, and a fixing unit 260 holding at least the injection nozzle 218. The nozzle 218 is connected to a sprue of the mold 300, and the resin is injected from the sprue into the cavity 322 through the runner 312. A boundary between the runner 312 and the cavity 322 is a gate. The runner 312 can be a hot runner or a cold runner.

The injection apparatus 200 or the cavity 322 may be omitted, however, performing family molding using the injection apparatus 200 or the cavity 322 makes it possible to improve a function and production efficiency of the resin body. For example, a type of the resin injected from the injection apparatus 100 and a type of the resin injected from the injection apparatus 200 can be made different from each other. The resin body 401 and the resin body 402 can be joined to each other, and one resin molded product can include the resin body 401 made of the resin injected from the injection apparatus 100 and the resin body 402 made of the resin injected from the injection apparatus 200. One resin molded product is made of a plurality of types of resins, which makes it possible to improve a function of the resin molded product.

Insert molding can be performed by disposing an insert member in the mold 300. Further, a portion including the resin body 401 and a portion including the resin body 402 can be joined to the insert member.

Here, the example in which the injection apparatus 100 is applied to the injection molding system 1000 using the mold 300 is described. However, the injection apparatus 100 can also be applied to a so-called three-dimensional (3D) printer that moves the injection apparatus 100 to mold a resin body.

As a method of manufacturing a resin product, an injection molding method is known. In the injection molding method, a molten resin is injected into a cavity space inside a mold by using a screw, a plunger, and the like, and is cooled and solidified inside the mold. After the resin is solidified, the mold is opened, and a molded product is taken out. A series of operation from injection of the molten resin to take-out of the molded product is repeated to continuously mass-produce resin molded products. As an apparatus performing the injection molding method, a pre-plunger molding machine and an inline screw molding machine are known, for example.

There is an increasing demand for additional molding processing in order to give an added value, such as decoration, multicolor molding, and joined molding, to a molded product. For this purpose, an injection apparatus 100 having only an injection unit without a mold clamping mechanism is mounted on a mold or an existing injection molding machine. In these applications, it is necessary to dispose the injection apparatus 100 in an existing space, and therefore downsizing of the injection apparatus 100 is required.

The above-described inline screw molding machine performs measurement and injection of the molten resin by one plasticizing screw, and therefore a total length of the injection unit tends to be increased. In contrast, in the pre-plunger injection molding machine, a plasticizing unit including a screw for melting the resin and an injection unit having an injection cylinder for storing and injecting the plasticized molten resin are separated from each other. The plasticizing unit and the injection unit can be disposed in parallel with each other, and therefore the total length of the injection unit can be reduced.

As described above, although the pre-plunger molding machine and the inline screw molding machine have difference in structure, rigidity of the injection apparatus 100 is important for downsizing in any of the machines. In particular, if the rigidity of the fixing unit 60 of the injection apparatus 100 receiving large injection pressure during injection is insufficient, a load and deformation occur on the fixing unit 60 and an internal driving mechanism, which may cause breakage of the injection apparatus 100 or reduction in service life of the injection apparatus 100. To secure rigidity, it is necessary to upsize and strengthen the injection apparatus 100. This inhibits downsizing of the injection apparatus 100.

Irrespective of application of the injection apparatus 100, the injection apparatus 100 is desirably made small. In a case where the injection molding system 1000 includes the plurality of injection apparatuses 100 and 200, downsizing of the injection apparatus 100 is effective to enhance flexibility of arrangement of the injection apparatuses 100 and 200. To provide an injection apparatus 100 in a small size, it is required to devise the structure of the injection apparatus 100.

The injection apparatus 100 according to each of the embodiments will be described in detail below. The above-described injection apparatus 200 can have a configuration similar to or different from the configuration of the injection apparatus 100.

Figure 1B:
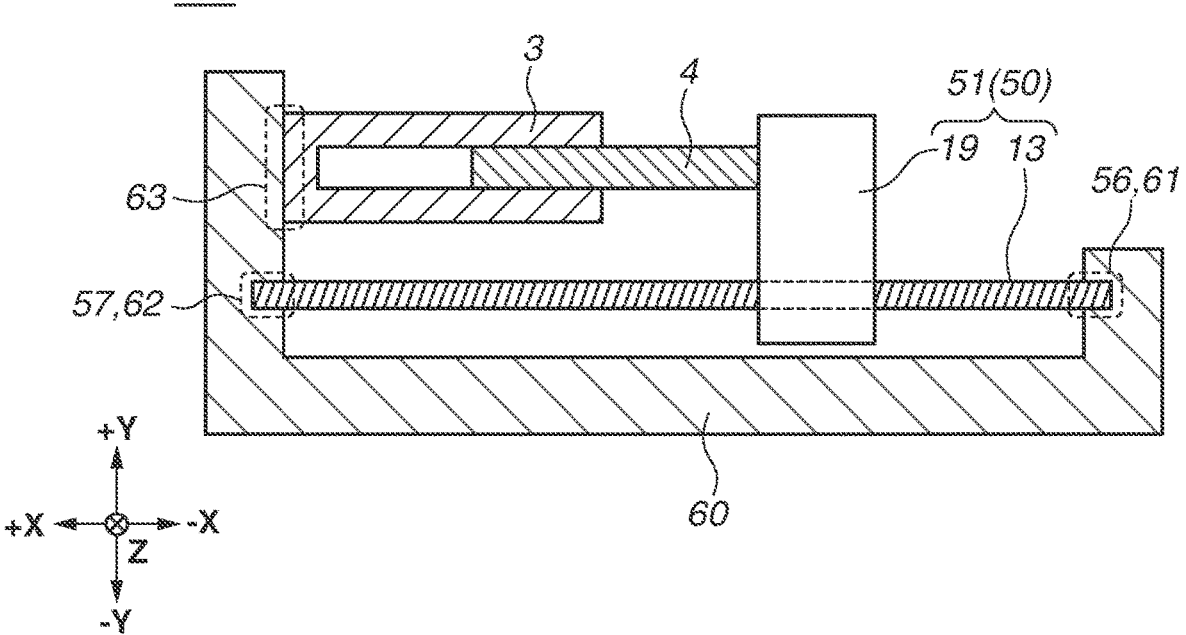

FIG. 1B is a schematic X-Z cross-sectional view of the injection apparatus 100 according to a first embodiment. The injection apparatus 100 includes the injection nozzle 18 illustrated in FIG. 1A (not illustrated in FIG. 1B), an injection cylinder 3, an injection plunger 4, a movable unit 50, and the fixing unit 60. The injection cylinder 3 stores the resin to be supplied to the injection nozzle 18. The injection plunger 4 presses the resin stored in the injection cylinder 3. The resin pressed by the injection plunger 4 is supplied to the injection nozzle 18. The injection nozzle 18 injects the supplied resin. The injection nozzle 18, the injection cylinder 3, and the injection plunger 4 can be collectively referred to as an injection unit.

The movable unit 50 moves the injection plunger 4. When the movable unit 50 moves the injection plunger 4 in a +X direction, the injection plunger 4 presses the resin stored in the injection cylinder 3. When the movable unit 50 moves the injection plunger 4 to an appropriate position in a –X direction, a volume of the resin stored in the injection cylinder 3 can be set and the amount of the resin can be measured. In the following, the moving direction of the injection cylinder 3 is referred to as an X direction. A Y direction is a direction orthogonal to the X direction, and a Z direction is a direction orthogonal to the X direction and the Y direction. The +X direction is in forward direction, and the –X direction is a backward direction.

The movable unit 50 includes a ball screw 51. The ball screw 51 includes a moving block 19 as a moving member, and a screw shaft 13. The moving block 19 moves in the X direction, and the moving block 19 is joined to the injection plunger 4. The screw shaft 13 rotates to move the moving block 19.

The screw shaft 13 and the injection plunger 4 are disposed side by side in a direction (e.g., Y direction) orthogonal to the X direction. It is thereby possible to suppress upsizing of the injection apparatus 100 in the X direction as compared with a case where the screw shaft 13 and the injection plunger 4 are disposed side by side in the X direction. Typically, each of the screw shaft 13 and the injection plunger 4 has a dimension in the X direction greater than a dimension in the direction (e.g., Y direction) orthogonal to the X direction. It is thereby possible to suppress upsizing of the injection apparatus 100 in the direction (e.g., Y direction) orthogonal to the X direction even if the screw shaft 13 and the injection plunger 4 are disposed side by side in the direction (e.g., Y direction) orthogonal to the X direction.

The fixing unit 60 holds the injection cylinder 3 and the movable unit 50. The fixing unit 60 includes a holding portion 61 holding a rear end part 56 of the screw shaft 13, a holding portion 62 holding a front end part 57 of the screw shaft 13, and a holding portion 63 holding the injection cylinder 3. The moving block 19 is provided between the holding portion 61 and the holding portion 62. The moving block 19 moves on a center portion between the rear end part 56 and the front end part 57 of the screw shaft 13. Thus, a range of the rear end part 56 and a range of the front end part 57 respectively supported by the holding portions 61 and 62 are out of a moving range of the moving block 19. The holding portion 63 is provided to press the injection cylinder 3 when the injection plunger 4 presses the resin. The moving block 19 is the moving member moving in the X direction and is also a rigid member having rigidity.

The holding portion 61, the holding portion 62, and the holding portion 63 of the fixing unit 60 are parts of an integrated rigid member or parts of a rigid member obtained by joining and integrating a plurality of rigid members with one another. The fixing unit 60 fixed to the screw shaft 13 by the holding portion 61 and the holding portion 62 can thus sufficiently receive, with the holding portion 63, force transmitted from the injection plunger 4 to the injection cylinder 3 through the resin. As a result, the resin can be stably pressed and injected.

The rigid member in the fixing unit 60 can be made of a metal material, such as iron and an iron alloy. The integrated rigid member can be fabricated by cutting or casting of a metal material. The rigid member obtained by joining and integrating the plurality of rigid members with one another is obtained by mechanically joining the plurality of rigid members by fastening, welding, bonding, fitting, or the like. The number of rigid members joined in the fixing unit 60 is two or more. For example, the holding portion 61, the holding portion 62, and the holding portion 63 can be parts of the same rigid member, or two of the holding portion 61, the holding portion 62, and the holding portion 63 can be parts of the same rigid member and the remaining one can be a part of a different rigid member. Two of the holding portion 61, the holding portion 62, and the holding portion 63 can be parts of different rigid members, and the different rigid members can be joined by another rigid member.

In the following, a form will be described in which the fixing unit 60 at least includes the rigid member including the holding portion 61, the rigid member including the holding portion 62, and the rigid member including the holding portion 63.

FIG. 2A is a schematic X-Z cross-sectional view of the injection apparatus 100. A rear block 66 is an example of the rigid member including the holding portion 61. A front block 67 is an example of the rigid member including the holding portion 62. A front plate 1 is an example of the rigid member including the holding portion 63.

The rear block 66 includes a bearing 14 and a bearing holder 15 to which the bearing 14 is fixed. The bearing 14 holds the rear end part 56 of the screw shaft 13. The bearing 14 is, for example, an angular ball bearing.

The front block 67 includes a bearing 16 and a bearing holder 17 to which the bearing 16 is fixed. The bearing 16 holds the front end part 57 of the screw shaft 13. The bearing 16 is, for example, a deep-groove ball bearing.

In the X direction, the front block 67 is disposed between the rear block 66 and the front plate 1.

The front plate 1 is provided with a through hole, and injection nozzle 18 is exposed to outside of the injection apparatus 100 through the through hole. An outer diameter of the injection cylinder 3 is set greater than the through hole provided with the injection nozzle 18. In the injection cylinder 3, a portion positioned outside the through hole in the Y direction abuts on a portion around the through hole of the front plate 1 in the X direction. Accordingly, the portion around the through hole of the front plate 1 serves as the holding portion 63. The holding portion 63 is provided to be pressed by the injection cylinder 3 in the X direction when the injection plunger 4 presses the resin.

The fixing unit 60 includes a base plate 2 joined to the rear block 66 and the front block 67. The screw shaft 13 is disposed between the injection plunger 4 and the base plate 2 in the direction orthogonal to the X direction. The base plate 2 is also an example of the rigid member included in the fixing unit 60. In the direction orthogonal to the X direction, the front block 67 is disposed between the injection cylinder 3 and the base plate 2.

The fixing unit 60 includes a rear plate 30 joined to the base plate 2. In the X direction, the rear block 66 and the front block 67 are disposed between the front plate 1 and the rear plate 30. The rear plate 30 is also an example of the rigid member included in the fixing unit 60.

In FIG. 2A, joint means 65 joining the rigid members to one another are illustrated as screws. In FIG. 2A, two rigid members adjacent to one joint means 65 are joined to each other by the one joint means 65. Specific examples of the joint means 65 include fastening, welding, bonding, and fitting as described above. Further, the plurality of joint means 65 can include a plurality of types of joint means. For example, two rigid members can be fastened to each other, and the other two rigid members can be welded to each other.

The front block 67 is joined to the front plate 1. In detail, the bearing holder 17 of the front block 67 is joined to the front plate 1. The front plate 1 is joined to the base plate 2. The front block 67 is joined to the base plate 2.

In detail, the bearing holder 17 of the front block 67 is joined to the base plate 2. The rear plate 30 is joined to the base plate 2.

The moving block 19 as the moving member includes a nut 10 and an injection ram 9 to which the nut 10 is fixed, and the injection ram 9 and the injection plunger 4 are disposed side by side in the X direction. The injection ram 9 is a pressing member pressing the injection plunger 4 in the +X direction. When the moving block 19 is moved in the +X direction and the injection plunger 4 is pushed in the +X direction by the injection ram 9, the injection plunger 4 moves in the +X direction. When the moving block 19 is moved in the −X direction and the injection plunger 4 is pulled in the −X direction by the injection ram 9, the injection plunger 4 moves in the −X direction. The moving block 19 (injection ram 9) can be fixed to the injection plunger 4, or the moving block 19 (injection ram 9) can be separable from the injection plunger 4. If the moving block 19 (injection ram 9) and the injection plunger 4 are separable in the X direction, force applied from the injection plunger 4 to the moving block 19 (injection ram 9) in a direction intersecting the X direction can be reduced.

In a case where the injection ram 9 is separable from the injection plunger 4, the injection plunger 4 does not move in the −X direction even when the injection ram 9 is moved in the −X direction. However, the injection plunger 4 can be moved in the −X direction, when the injection plunger 4 is pressed by the resin in the injection cylinder 3 in the −X direction while the injection plunger 4 and the injection ram 9 are separated from each other in the X direction.

The injection apparatus 100 includes an injection motor 23 rotating the screw shaft 13. In the X direction, the rear block 66 is disposed between the injection motor 23 and the moving block 19.

The injection motor 23 is joined to the rear plate 30. The injection motor 23 can also be provided on the front end part 57 side (front plate 1 side). In this case, however, the injection motor 23 on the front end part 57 side may contact with the mold 300. Thus, it is necessary to elongate the injection nozzle 18 in order to avoid the contact of the injection motor 23 on the front end part 57 side with the mold 300. It is thus advantageous in reliability improvement and downsizing of the injection apparatus 100 if the injection motor 23 is provided on the rear end part 56 side (rear plate 30 side).

The fixing unit 60 includes guide rails 12 guiding the moving block 19. The guide rails 12 are joined to the base plate 2. The guide rails 12 are examples of a guide member, and can be, for example, linear guide rails. The moving block 19 includes guide sliders 11 engaging with the respective guide rails 12. The guide sliders 11 are fixed to the injection ram 9. Movement of the moving block 19 in a direction (e.g., Y direction) perpendicular to the X direction is regulated by the guide rails 12 and the guide sliders 11.

FIG. 2B is a schematic X-Y cross-sectional view of the injection apparatus 100 according to the first embodiment. The injection apparatus 100 can include a plasticizing cylinder 7 and a plasticizing screw 6. The plasticizing cylinder 7 stores the resin to be supplied to the injection cylinder 3. The plasticizing screw 6 presses the resin stored in the injection cylinder 3. The resin pushed out from the plasti-cizing cylinder 7 by the plasticizing screw 6 is supplied to the injection cylinder 3 through a flow path provided in a coupling member 5 coupling flow paths.

The injection apparatus 100 includes the plasticizing cylinder 7 storing the resin to be supplied to the injection cylinder 3 and the plasticizing screw 6 pressing the resin stored in the injection cylinder 3. The fixing unit 60 holds the plasticizing cylinder 7.

The plasticizing cylinder 7 can be disposed at an optional position as long as design is possible. For example, as discussed in Japanese Patent Application Laid-Open No. 2019-104153, the plasticizing cylinder 7 and the plasticizing screw 6 can be disposed in the injection cylinder 3, and the plasticizing cylinder 7 can be used as the injection plunger 4. However, in this example, the injection plunger 4 and the plasticizing screw 6 are disposed such that a part of the injection cylinder 3 and a part of the plasticizing cylinder 7 are positioned between the injection plunger 4 and the plasticizing screw 6 in the direction orthogonal to the X direction. This makes it possible to suppress upsizing of the injection apparatus 100 in the X direction as compared with a case where the injection cylinder 3 and the plasticizing screw 6 are arranged in the X direction. Typically, each of the plasticizing cylinder 7 and the plasticizing screw 6 has a dimension in the X direction greater than a dimension in the direction (e.g., Y direction) orthogonal to the X direction. It is therefore possible to suppress upsizing of the injection apparatus 100 in the direction (e.g., Y direction) orthogonal to the X direction even if the injection cylinder 3 and the injection plunger 4 are disposed side by side and the plasticizing cylinder 7 and the plasticizing screw 6 are disposed side by side in the direction (e.g., Y direction) orthogonal to the X direction.

To secure rigidity of the injection apparatus 100, increase in thickness of a plate and a cover configuring a housing of the injection apparatus 100 is effective. However, such a configuration may lead to upsizing and weight increase of the injection apparatus 100. In the injection apparatus 100 according to the first embodiment, the rigidity is thus increased by the front plate 1 and the base plate 2. More specifically, the fixing unit 60 of the injection apparatus 100 includes at least the front plate 1 having a thickness of 15 mm to 70 mm (e.g., approximately 35 mm), the base plate 2 having a thickness of 20 mm to 80 mm (e.g., approxi-mately 40 mm), and the rear plate 30 that has a thickness of 10 mm to 50 mm (e.g., approximately 25 mm) and is disposed in parallel so as to face the front plate 1. Further, the movable unit 50, the injection cylinder 3, and the injection plunger 4 mounted on the fixing unit 60 are covered with covers 31, 32, and 33 each having a thickness of 1 mm to 10 mm (e.g., approximately 5 mm or more). The covers 31, 32, and 33 as the rigid members are parts of the fixing unit 60. In the direction (e.g., Z direction) orthogonal to the X direction, the screw shaft 13 and the injection plunger 4 are disposed between the base plate 2 and the cover 31. The covers 32 and 33 as the rigid members are parts of the fixing unit 60. In the direction (e.g., Y direction) orthogonal to the X direction, the screw shaft 13 and the injection plunger 4 are disposed between the cover 32 and the cover 33.

The front plate 1 and the base plate 2 are joined and integrated in an L-shape by screw fastening. The rear plate 30 and the base plate 2 are joined and integrated in an L-shape by screw fastening. The injection cylinder 3 that stores and injects the molten resin is joined to the front plate 1, and the inserted injection plunger 4 having a diameter of 10 mm to 40 mm (e.g., approximately 20 mm) is advanced by a linear motion mechanism using the ball screw 51, which makes it possible to inject the molten resin. The injection cylinder 3 is coupled to the plasticizing cylinder 7 including the plasticizing screw 6 having a diameter of 15 mm to 70 mm (e.g., approximately 32 mm) through the coupling member 5. When the plasticizing screw 6 is rotated by a plasticizing motor 21 mounted with a reduction gear 20, resin pellets supplied from a hopper (not illustrated) into the plasticizing cylinder 7 are melted (plasticized). The reduc-tion gear 20 is fixed to the rear plate 30. The plasticized resin is stored in the injection cylinder 3 through the flow path in the coupling member 5.

The flow path for the molten resin in the coupling member 5 is provided with a check valve 8 that prevents the molten resin from reversely flowing toward the plasticizing screw 6 during injection.

The movable unit 50 that advances and retreats the injection plunger 4 engages with the base plate 2. The movable unit 50 includes the moving block 19 and the screw shaft 13 that has a diameter of 25 mm to 75 mm (e.g., approximately 50 mm) and linearly moves the moving block 19. The moving block 19 includes the injection ram 9 directly pressing the injection plunger 4, the nut 10 fixed to the injection ram 9, and two guide sliders 11. The fixing unit 60 illustrated in FIGS. 1A and 1B includes two guide rails 12 fastened to the base plate 2 and on which the respective guide sliders 11 slide, the rear block 66, and the front block 67. At least the nut 10 and the screw shaft 13 configure the ball screw, and the ball screw includes a ball (not illustrated). The rear block 66 includes the bearing 14 supporting the rear end part 56 of the screw shaft 13, and the bearing holder 15 that is a block member to which the bearing 14 is fixed. The bearing 14 is, for example, an angular ball bearing. The bearing holder 15 is joined and integrated with the base plate 2 by screw fastening. The rear end part 56 of the screw shaft 13 is coupled to an output shaft of a reduction gear 24 mounted on the injection motor 23, through a coupling 22. The screw shaft 13 is rotated by the injection motor 23, which makes it possible to advance and retreat the injection ram 9 fixed to the guide sliders 11, along the guide rails 12. The reduction gear 24 is fixed to the rear plate 30. A mover of the injection motor 23 is directly or indirectly joined to the movable unit 50, and a stator of the injection motor 23 is directly or indirectly joined to the fixing unit 60.

The front block 67 is disposed on an inner angle side of an L-shaped joint portion where the front plate 1 and the base plate 2 are joined to each other. The front block 67 includes the bearing 16 supporting the front end part 57 of the screw shaft 13, and the bearing holder 17 that is a block member to which the bearing 16 is fixed. The bearing 16 is, for example, a deep-groove ball bearing. The bearing holder 17 is joined to the front plate 1 and the base plate 2 by screw fastening.

In the present embodiment, the front plate 1 and the base plate 2 are joined and integrated by screw fastening, and the rear plate 30 and the base plate 2 are joined and integrated by screw fastening. Further, the bearing holder 17 and the front plate 1 are joined and integrated by screw fastening, the bearing holder 17 and the base plate 2 are joined and integrated by screw fastening, and the bearing holder 15 and the base plate 2 are joined and integrated by screw fastening. However, the method of joining the members is not limited thereto, and for example, the members can be joined by welding or the like, or the set of members can be integrally fabricated by cutting from one member, casting, or the like.

Figure 3:
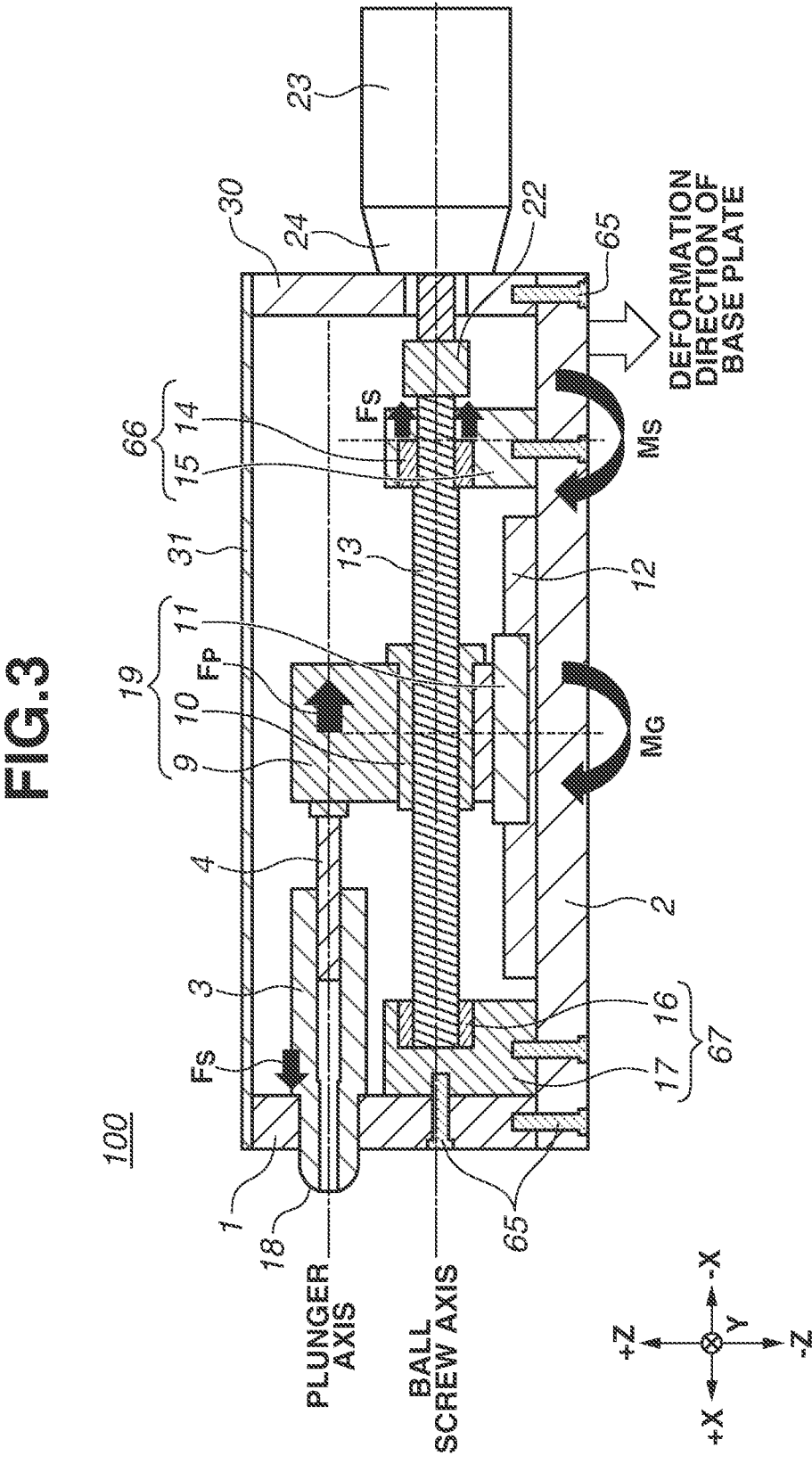
FIG. 3 is a schematic view illustrating an injection apparatus.

FIG. 3 illustrates a state of force applied to the fixing unit 60 when the injection apparatus 100 injects the resin. During injection, the screw shaft 13 rotates with rotation of the injection motor 23 having a rated output of 5 kW, and the injection ram 9 mounted with the nut 10 and the guide sliders 11 advances on the guide rails 12. As a result, the injection plunger 4 advances, and the resin stored in the injection cylinder 3 is injected into a mold cavity (not illustrated) through the nozzle 18. At this time, the front plate 1 is fixed to the mold by a device or a member (not illustrated).

Pressure (injection pressure) inside the injection cylinder 3 during injection can be increased to about 100 to 200 MPa. Force $F_S$ transferred from the injection plunger 4 to the injection cylinder 3 through the resin when the injection plunger 4 presses the resin can be sufficiently received by the holding portion 63 (see FIG. 2A), and the resin can be stably pressed and injected.

A large injection reaction force $F_P$ is applied to the injection ram 9 that is in contact with a rear end of the injection plunger 4. For example, when the injection plunger 4 has an injection pressure of 200 MPa applied at an outer diameter of 20 mm, the injection reaction force $F_P$ can become 62 kN or more.

A part of the injection reaction force applies a moment load $M_G$ to the base plate 2 to which the guide rails 12 are fastened, with the guide sliders 11 of the injection ram 9 as fulcrums.

Further, the other part of the injection reaction force applies, through the screw shaft 13, a thrust load $F_S$ to the bearing holder 15 holding the bearing 14 (angular ball bearing) that supports the rear end part 56 of the screw shaft 13.

To prevent breakage of the screw shaft 13 caused by thermal expansion and the like, the front end part 57 of the screw shaft 13 is supported free in a thrust direction by the bearing 16, and the thrust direction of the rear end part 56 is fixed by the bearing 14.

The thrust load $F_S$ applies a moment load $M_S$ to the base plate 2 with a lower part of the bearing holder 15 as a fulcrum. By these moment loads, deformation force occurs in the base plate 2 with the L-shaped joint portion with the front plate 1 as a fulcrum. In a case where the base plate 2 and the front plate 1 are joined by screw fastening, the deformation force acts so as to extend the screw and to open the L-shaped joint portion, and bends and deforms the base plate 2.

Even in a case where the base plate 2 and the front plate 1 are joined by welding or the like, the deformation force acts so as to expand an inner angle of the L-shaped joint portion and bends and deforms the base plate 2.

In the injection apparatus 100 according to the first embodiment, the front block 67 supporting the front end part 57 of the screw shaft 13 is disposed on the inner angle side of the L-shaped joint portion between the front plate 1 and the base plate 2. The bearing holder 17 of the front block 67 is also joined to the front plate 1 and the base plate 2. Even if large injection reaction force occurs, opening of the L-shaped joint portion and bending deformation of the base plate 2 can be suppressed.

Deformation caused by the injection reaction force, of the base plate 2 as the apparatus housing, and opening deformation of the L-shaped joint portion between the front plate 1 and the base plate 2 can be suppressed by the block member (bearing holder 17) integrated with the front plate 1 and the base plate 2. This makes it possible to prevent breakage of the apparatus housing and the driving mechanism. Since the bearing 16 supporting the front end part 57 of the screw shaft 13 as the injection driving mechanism is fixed to the block member (bearing holder 17), the injection apparatus 100 can be reduced in total length and downsized.

Figure 4A:
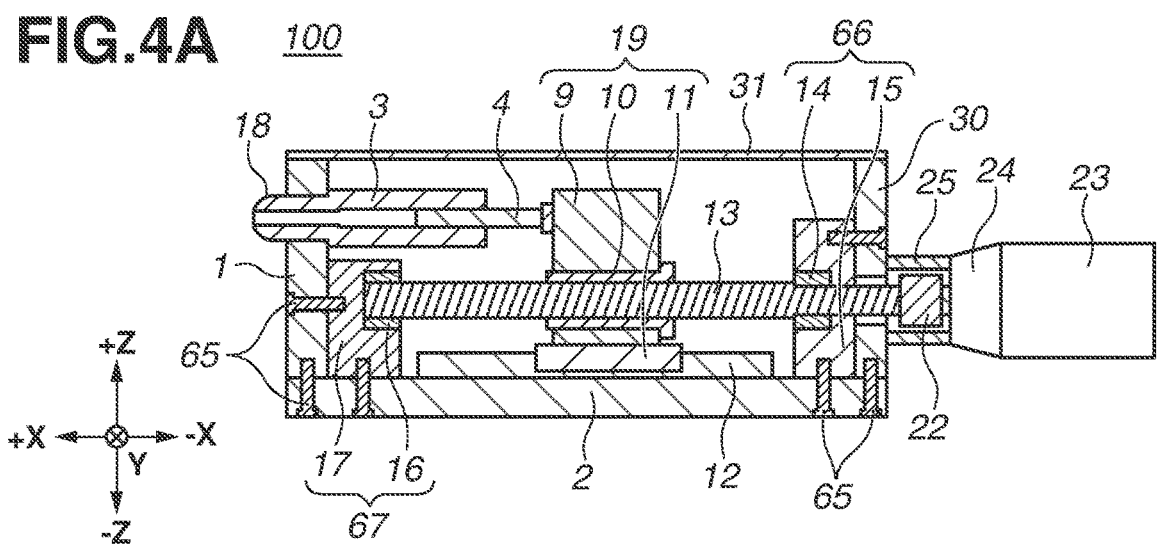
FIGS. 4A and 4C are schematic views each illustrating an injection apparatus.

FIG. 4A is a schematic X-Z cross-sectional view of the injection apparatus 100 according to a second embodiment. In the present embodiment, the rear block 66 is fastened and joined to the base plate 2 and the rear plate 30 by screws. In detail, the bearing holder 15 of the rear block 66 is joined to the rear plate 30.

Further, the coupling 22 is disposed on a rear side of the rear plate 30. The reduction gear 24 mounted with the injection motor 23 is coupled to the rear plate 30 through a mounting member 25 for mounting the reduction gear 24. In the present embodiment, the bearing holder 15 is fastened and joined to the base plate 2 and the rear plate 30 by the screws; however, the method of joining the members is not limited thereto. For example, the members can be joined by welding or the like, or the set of members can be joined and fabricated by cutting from one member, or the like. Further, the bearing holder 15 is not necessarily joined to the base plate 2 as long as the bearing holder 15 is joined to the rear plate 30.

Figure 4B:
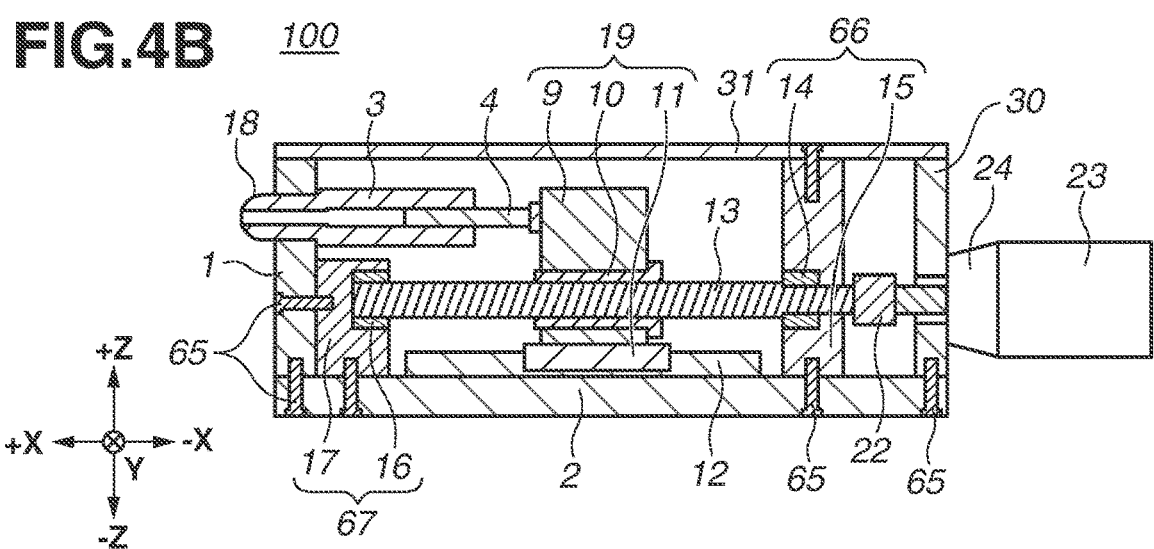

FIG. 4B is a schematic X-Z cross-sectional view of the injection apparatus 100 according to a third embodiment. In the present embodiment, the rear block 66 is joined to the cover 31 as the rigid member. In detail, the bearing holder 15 of the rear block 66 is fastened and joined to the cover 31 by a screw. In the present embodiment, the bearing holder 15 and the cover 31 are fastened and joined by the screw; however, the method of joining the members is not limited thereto, and for example, the members can be joined by welding or the like, or the set of members can be joined and fabricated by cutting from one member, or the like.

According to the second embodiment or the third embodiment, rigidity of the bearing holder 15 is increased as compared with the first embodiment because the bearing holder 15 is also joined to the other members other than the base plate 2. The moment load $M_S$ applied to the base plate 2 by the thrust load $F_S$ acting on the bearing holder 15 during injection can be reduced, thereby making it possible to further suppress bending deformation of the base plate 2.

Figure 4C:
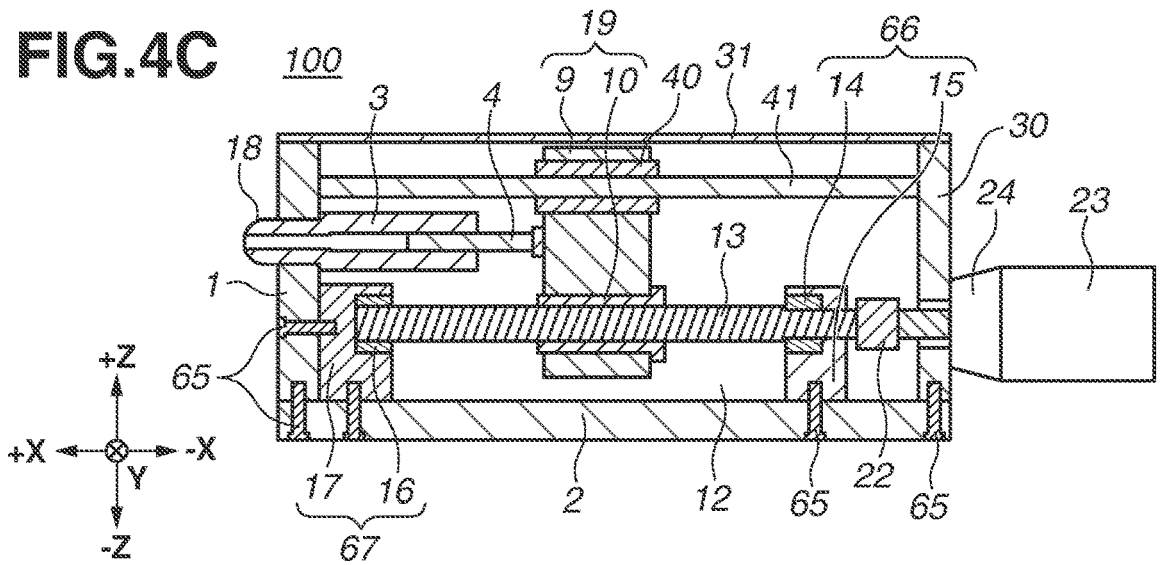

FIG. 4C is a cross-sectional side view of the injection apparatus 100 according to a fourth embodiment. The fourth embodiment is different from the first embodiment in that the linear motion guide mechanism of the screw shaft 13 is changed from the configuration including the guide sliders 11 and the guide rails 12 to a configuration including a guide bush 40 and a guide shaft 41.

The guide shaft 41 is also an example of the guide member. In the direction (e.g., Y direction) orthogonal to the X direction, the screw shaft 13 is disposed between the guide shaft 41 and the base plate 2. The guide shaft 41 is joined to the front plate 1 and the rear plate 30. The guide bush 40 is disposed on the moving block 19, and the guide shaft 41 is supported between the front plate 1 and the rear plate 30 in a state of being parallel to the screw shaft 13. The bearing holder 15 can be joined to the cover 31 as described in the second embodiment, or can be joined to the rear plate 30 as described in the third embodiment.

Figure 5A:
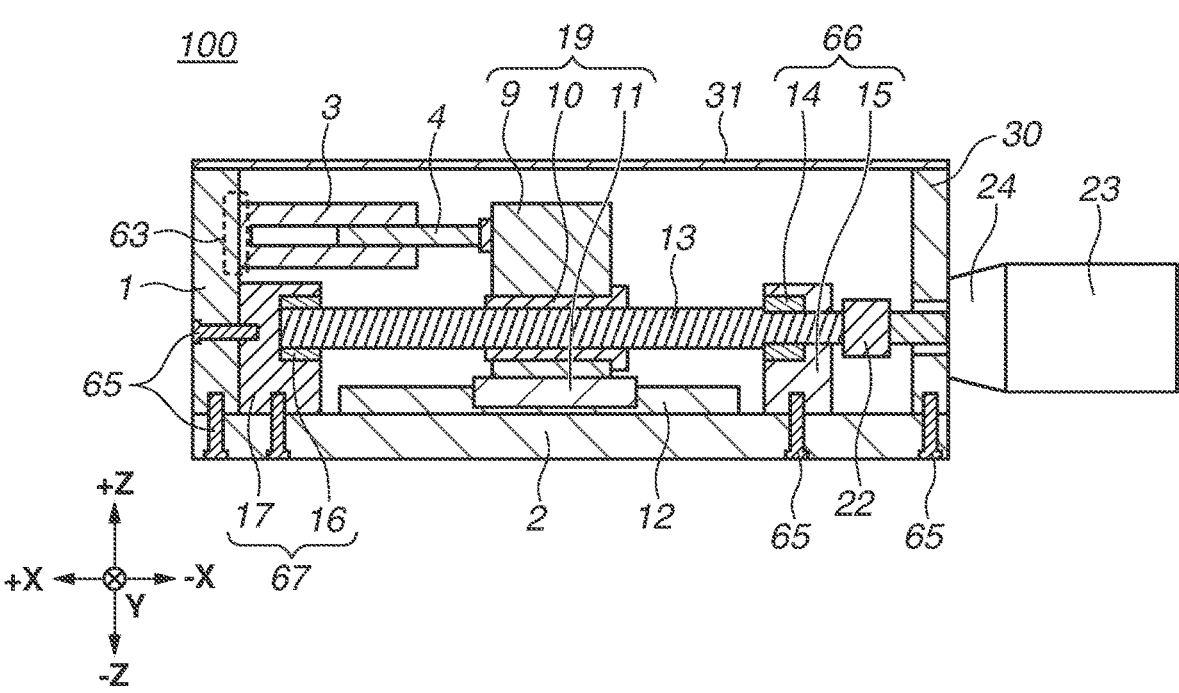
FIGS. 5A and 5B are schematic views each illustrating an injection apparatus.
Figure 5B:
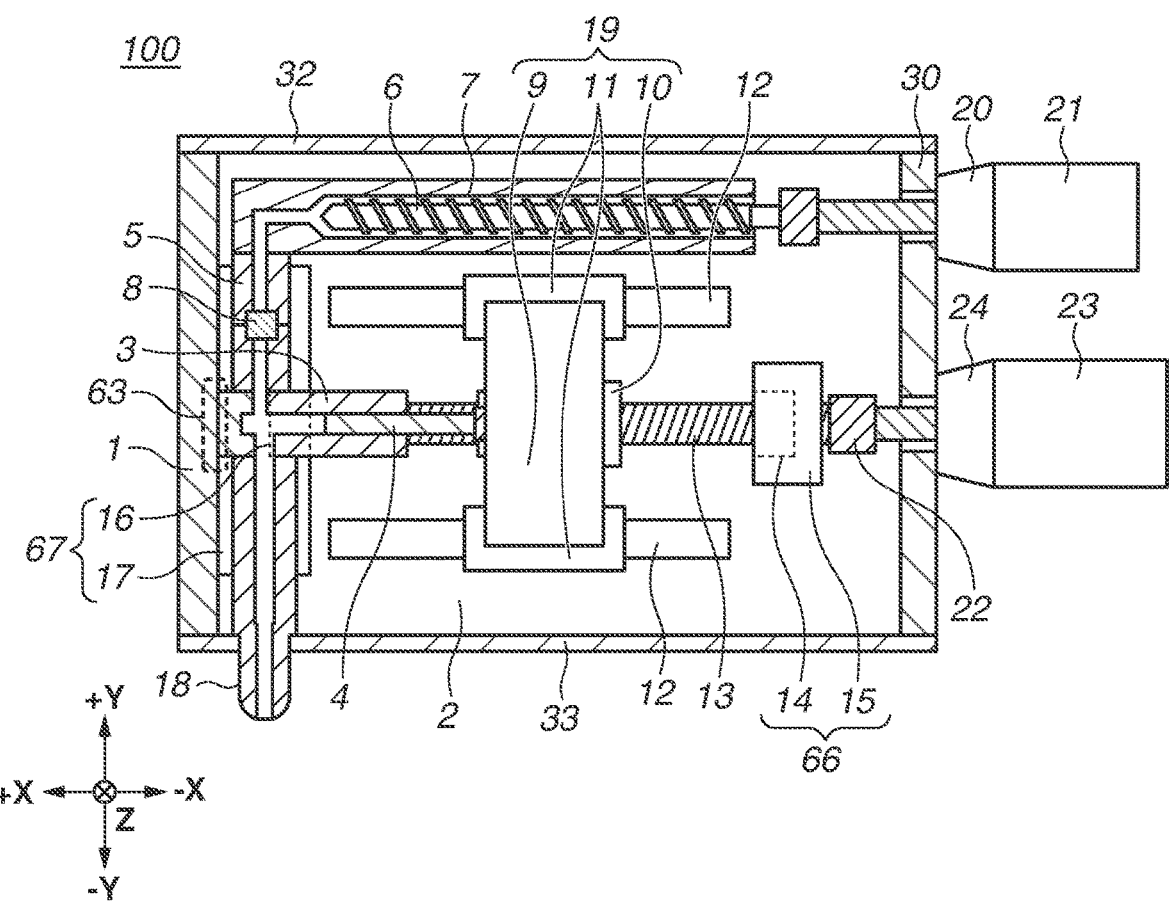

FIG. 5A is a schematic X-Z cross-sectional view of the injection apparatus 100 according to a fifth embodiment. FIG. 5B is a schematic X-Y cross-sectional view of the injection apparatus 100 according to the fifth embodiment. The fifth embodiment is different in position and injection direction of the injection nozzle 18, from the first embodiment. A flow path direction of the injection nozzle 18 intersects (e.g., is orthogonal to) the moving direction of the injection plunger 4. Even in such a case, the holding portion 63 is provided to be pressed by the injection cylinder 3 when the injection plunger 4 presses the resin.

In the examples described above, the fixing unit 60 includes the front plate 1 and the base plate 2 different from the front plate 1, and the front plate 1 and the base plate 2 are joined to each other. However, the fixing unit 60 can also include an integrated rigid member that includes a portion equivalent to the front plate 1 and a portion equivalent to the base plate 2. Such an integrated rigid member can be referred to as an L-shaped plate because the integrated rigid member includes a portion having an L-shaped cross-section. In this case, the L-shaped plate is the rigid member including the holding portion 63. The rear block 66 and the front block 67 can be joined to the L-shape plate. The fixing unit 60 can also include an integrated rigid member that includes a portion equivalent to the front plate 1, a portion equivalent to the base plate 2, and a portion equivalent to the rear plate 30. The fixing unit 60 can also include an integrated rigid member that includes a portion equivalent to the base plate 2 and a portion equivalent to at least any of the cover 32 and the cover 33. Further, the fixing unit 60 can also include an integrated rigid member that includes a portion equivalent to the cover 31 and a portion equivalent to at least any of the front plate 1 and the rear plate 30. As described above, the fixing unit 60 can include an integrated rigid member that includes portions equivalent to at least two of the front plate 1, the base plate 2, the rear plate 30, the cover 31, the cover 32, and the cover 33.

The embodiments described above can be appropriately modified within a range not departing from the technical idea. For example, a plurality of embodiments can be combined. Further, a part of matters in at least one embodiment can be deleted or replaced. Further, new matters can be added to at least one embodiment.

The disclosed contents of the present specification are not limited to what is explicitly described in the present specification, and include all matters that can be grasped from the present specification and the drawings attached to the present specification. Further, the disclosed contents of the present specification include a complementary set of individual concepts described in the present specification. More specifically, for example, if description of "A is B" is included in the present specification, the present specification discloses a case where "A is not B" even if description of "A is not B" is omitted. This is because description of "A is B" is based on the premise that a case where "A is not B" is considered.

According to the embodiments of the present disclosure, it is possible to provide the technique advantageous in improvement of rigidity of the injection apparatus.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-087840, filed May 30, 2022, which is hereby incorporated by reference herein in its entirety.

What is claimed is:

1. An injection apparatus, comprising:
an injection nozzle configured to inject a resin;
an injection cylinder configured to store the resin to be supplied to the injection nozzle;
an injection plunger configured to press the resin stored in the injection cylinder;
a movable unit, configured to move the injection plunger, including a moving member and a ball screw including a screw shaft, the moving member being configured to move in a predetermined direction and being joined or contacted to the injection plunger, the screw shaft being configured to rotate to move the moving member; and
a fixing unit, configured to hold the injection cylinder and the movable unit, including a first portion for holding a first end part of the screw shaft, a second portion for holding a second end part of the screw shaft, and a third portion for holding the injection cylinder,
wherein the screw shaft and the injection plunger are disposed side by side in a direction orthogonal to the predetermined direction,
wherein the moving member is provided between the first portion and the second portion,
wherein the third portion is provided so as to be pressed by the injection cylinder when the injection plunger presses the resin, and
wherein the injection cylinder is located inside the fixing unit,
wherein the injection plunger is configured to press the resin stored in the injection cylinder such that the resin is supplied to the injection nozzle via a flow path,
wherein the injection cylinder is located upstream of the nozzle along the flow path, and
wherein the nozzle is exposed to an outside of the fixing unit.

2. The injection apparatus according to claim 1, wherein the fixing unit includes a first rigid member including the first portion, a second rigid member including the second portion, and a third rigid member including the third portion.

3. The injection apparatus according to claim 2, wherein the second rigid member is joined to the third rigid member.

4. The injection apparatus according to claim 3, further comprising a motor configured to rotate the screw shaft, wherein, in the predetermined direction, the first rigid member is disposed between the motor and the moving member.

5. The injection apparatus according to claim 2,
wherein the fixing unit includes a fourth rigid member joined to the first rigid member and the second rigid member, and
wherein, in the direction orthogonal to the predetermined direction, the screw shaft is disposed between the injection plunger and the fourth rigid member.

6. The injection apparatus according to claim 5, wherein the third rigid member is joined to the fourth rigid member.

7. The injection apparatus according to claim 5, wherein, in the direction orthogonal to the predetermined direction, the second rigid member is disposed between the injection cylinder and the fourth rigid member.

8. The injection apparatus according to claim 5,
wherein the fixing unit includes a guide member configured to guide the moving member, and
wherein the guide member is joined to the fourth rigid member.

9. The injection apparatus according to claim 5,
wherein the fixing unit includes a guide member config-
ured to guide the moving member, and
wherein, in the direction orthogonal to the predetermined
direction, the screw shaft is disposed between the guide
member and the fourth rigid member.

10. The injection apparatus according to claim 5,
wherein the fixing unit includes a sixth rigid member,
wherein, in the direction orthogonal to the predetermined
direction, the screw shaft and the injection plunger are
disposed between the fourth rigid member and the sixth
rigid member, and
wherein the first rigid member is joined to the sixth rigid
member.

11. The injection apparatus according to claim 5,
wherein the fixing unit includes a fifth rigid member
joined to the fourth rigid member, and
wherein, in the predetermined direction, the first rigid
member and the second rigid member are disposed
between the third rigid member and the fifth rigid
member.

12. The injection apparatus according to claim 11,
wherein the first rigid member is joined to the fifth rigid
member.

13. The injection apparatus according to claim 11, further
comprising a motor configured to rotate the screw shaft,
wherein the motor is joined to the fifth rigid member.

14. The injection apparatus according to claim 11,
wherein the fixing unit includes a guide member config-
ured to guide the moving member, and
wherein the guide member is joined to the third rigid
member and the fifth rigid member.

15. The injection apparatus according to claim 2, wherein,
in the predetermined direction, the second rigid member is
disposed between the first rigid member and the third rigid
member.

16. The injection apparatus according to claim 2,
wherein the first rigid member includes a first bearing as
an angular ball bearing, and a bearing holder to which
the first bearing is fixed, and
wherein the second rigid member includes a second
bearing as a deep-groove ball bearing, and a bearing
holder to which the second bearing is fixed.

17. The injection apparatus according to claim 2, wherein
the first rigid member and the second rigid member are
joined to the third rigid member.

18. The injection apparatus according to claim 1, further
comprising:
a plasticizing cylinder configured to store the resin to be
supplied to the injection cylinder; and
a plasticizing screw configured to press the resin stored in
the injection cylinder,
wherein, in the direction orthogonal to the predetermined
direction, a part of the injection cylinder and a part of
the plasticizing cylinder are positioned between the
injection plunger and the plasticizing screw, and
wherein the fixing unit holds the plasticizing cylinder.

19. The injection apparatus according to claim 1,
wherein the moving member includes a nut and an
injection ram to which the nut is fixed,
wherein, in the predetermined direction, the injection ram
and the injection plunger are disposed side by side, and
wherein the injection ram is separable from the injection
plunger.

20. The injection apparatus according to claim 1,
wherein the injection plunger is movable in a first direc-
tion and a second direction that is opposite of the first
direction, and
wherein the third portion is provided so as to be pressed
in the first direction by the injection cylinder when the
injection plunger presses the resin in the first direction.

21. A method of manufacturing a resin body, the method
comprising injecting a resin from the injection apparatus
according to claim 1 into a cavity of a mold, to form the resin
body having a shape corresponding to a shape of the cavity.

22. A method of manufacturing a resin body, the method
comprising:
injecting a resin from the injection apparatus according to
claim 1 into a first cavity of a mold to form a resin body
having a shape corresponding to a shape of the first
cavity, the mold including the first cavity and a second
cavity; and
injecting a resin from another injection apparatus into the
second cavity of the mold to form a resin body having
a shape corresponding to a shape of the second cavity.

* * * * *